United States Patent [19]

Sens

[11] 4,055,946
[45] Nov. 1, 1977

[54] TWIN-SPOOL GAS TURBINE POWER PLANT WITH MEANS TO SPILL COMPRESSOR INTERSTAGE AIRFLOW

[75] Inventor: William H. Sens, West Hartford, Conn.

[73] Assignee: United Technologies Corporation, Hartford, Conn.

[21] Appl. No.: 671,517

[22] Filed: Mar. 29, 1976

[51] Int. Cl.² .......................... F02K 3/06; F02C 3/06; F02C 9/04; F02C 9/14
[52] U.S. Cl. .................................... 60/204; 60/226 R; 60/39.23; 60/39.27; 60/39.17
[58] Field of Search ............... 60/226 R, 39.29, 39.23, 60/204, 224, 39.16 R, 39.16 C, 39.16 S, 39.17, 39.27

[56] References Cited

U.S. PATENT DOCUMENTS

| 2,837,269 | 6/1958 | Torell | 60/39.29 |
|---|---|---|---|
| 3,091,080 | 5/1963 | Crim et al. | 60/39.29 |
| 3,638,428 | 2/1972 | Shipley et al. | 60/226 R |
| 3,688,504 | 9/1972 | Hutchinson et al. | 60/226 R |
| 3,809,490 | 5/1974 | Harner | 60/39.29 |
| 3,898,799 | 8/1975 | Pollert et al. | 60/226 R |
| 3,971,208 | 7/1976 | Schwent | 60/39.29 |

Primary Examiner—Carlton R. Croyle
Assistant Examiner—Robert E. Garrett
Attorney, Agent, or Firm—Norman Friedland

[57] ABSTRACT

In order to take advantage of the efficient utilization of fuel occasioned by operating a turbine type power plant of the multiple spool design at very high overall pressure ratios, the high pressure spool is operated at substantially full speed and substantially full pressure ratio at low altitude and the high pressure compressor exit temperature is maintained at or near the value for which the engine was designed to operate at the climb or altitude cruise condition by controlling the pressure of the air admitted to the high pressure compressor.

5 Claims, 1 Drawing Figure

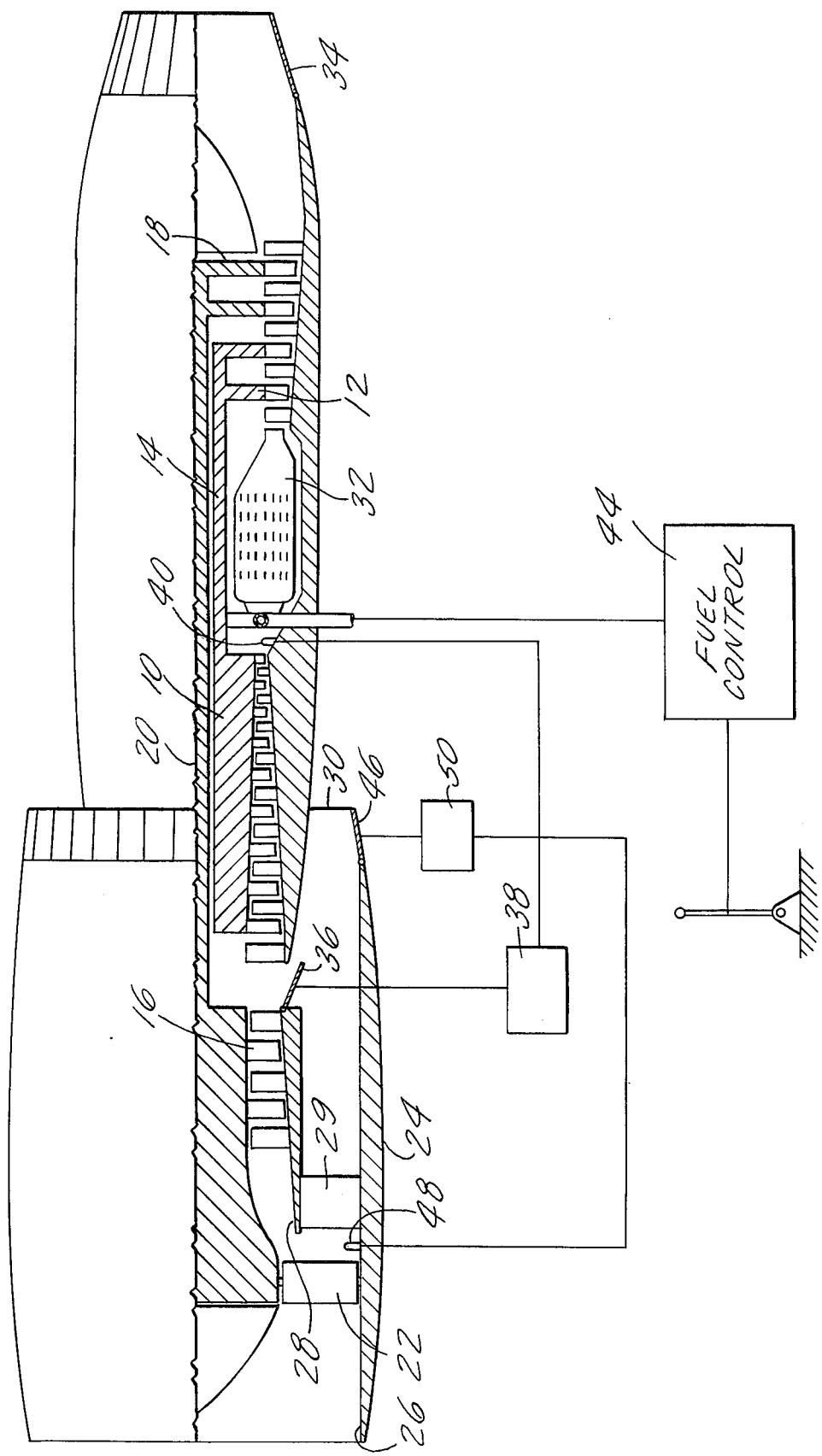

TWIN-SPOOL GAS TURBINE POWER PLANT WITH MEANS TO SPILL COMPRESSOR INTERSTAGE AIRFLOW

BACKGROUND OF THE INVENTION

This invention relates to turbine types of power plants and particularly to means for improving fuel consumption.

As is well known the lowest possible fuel consumption of a gas turbine power plant is realized when the engine is operating at very high pressure ratios. It is also well known that owing to such high pressure ratios when the aircraft operates at low altitudes certain problems are manifested that are deleterious to the engine parts and performance. Namely, the high pressure heavier components to maintain structural integrity, engine hardware becomes expensive since exotic materials from which they are fabricated are necessary to withstand the high temperatures and performance is impaired because of the aggravation associated with thermal growth and the need for additional cooling air for the burner and turbine hot parts.

I have found that I can obviate these problems and obtain an efficacious power plant that affords maximum fuel economy by designing the engine with a very high compression ratio and operating the high spool at substantially full speed and at substantially full pressure ratio at low altitude. To this end, this invention contemplates maintaining the exit temperature of a multiple spool axial flow compressor at or near the altitude cruise or climb value by incorporating bypass means ahead of the high spool for controlling the pressure of the air supplied to the high spool. As will be appreciated by those skilled in this art since the compressor exit temperature must be held constant over the entire operating range, this invention contemplates incorporating certain variable engine geometry features which may be necessary to optimize this control mode. Some of these features may include one or more by the following:
1. variable pitch propeller
2. variable pitch fan
3. variable fan stators
4. variable fan exit duct nozzle
5. variable stators in the low pressure compressor
6. variable pitch blades in the low pressure compressor
7. variable area nozzles in the low pressure turbine and
8. variable primary jet nozzle area Obviously, the choice of these features for obtaining the best engine configuration will depend on the specific aircraft application and mission.

SUMMARY OF THE INVENTION

An object of this invention is to provide an improved multiple spool axial compressor gas turbine power plant.

A still further object is to provide for an engine having improved fuel consumption by designing into the engine a very high compression ratio and operating the high spool at substantially full speed and at substantially full pressure ratio at sea level and low altitudes by adjusting the pressure of the air entering pressure of the high pressure spool to maintain a given compressor exit temperature over its entire operating range.

Other features and advantages will be apparent from the specification and claims and from the accompanying drawings which illustrate an embodiment of the invention.

BRIEF DESCRIPTION OF THE DRAWING

The sole FIGURE is a schematic of an axial flow, twinspool turbine type power plant illustrating this invention.

DESCRIPTION OF THE PREFERRED EMBODIMENT

It is to be understood that the hardware execution of the engine embodying this invention embraces the current state of engine technology exemplified by the turbine types of power plants manufactured by the Pratt & Whitney Aircraft Division of United Technologies Corporation of which include, for example, the JT8D and JT9D. The sole FIGURE so typifies, very schematically, such an engine and the invention contemplates the modification to be described herein to fulfill the operation requirements.

As can be seen by referring to the sole FIGURE, the engine is of the multiple spool design which comprises a high pressure multiple stage compressor section 10, driven by a high multi-stage turbine 12 interconnected thereby by shaft 14, and the low multi-stage compressor 16 driven by the low multi-stage turbine 18, interconnected thereby by coaxially mounted shaft 20.

In the preferred embodiment, the engine is designed with fan 22 which may include fixed or variable pitch fan blades housed in bypass duct 24. As noted, bypass duct 24 forms the inlet of the fan and extends beyond the inlet of the high spool compressor 10. Hence, flow from inlet 26 is divided so that a portion discharging from fan 22 is directed into the compressor section inlet 28, while the remaining portion is discharged via the supporting strut and anti-swirl vane 29 through the duct exit 30. Air flow from compressor inlet 28 flows axially through the engine; first through the low compressor 16, high compressor 10, through the burner section 32, the high turbine 12, low turbine 18 and ultimately through the exit nozzle 34.

As mentioned above, the lowest possible fuel consumption is obtained by designing the gas turbine engine to operate at the highest practical overall pressure ratio. This is achieved in accordance with well known engine technology. However, to achieve this end without hindering performance which is occasioned by incorporating the design criteria required for low altitude operation, this invention contemplates operating the high spool at substantially full RPM and at substantially full pressure ratio while maintaining the compressor exit temperature at or substantially at the value it would be when the aircraft is operating at the cruise or climb condition by controlling the pressure of air admitted to the high pressure compressor 10.

To this end valve 36, which may take any suitable form such as the flap type illustrated serves to bypass the high compressor 10 by virtue of its moving to full open to full closed position. Actuator and controller 38 schematically illustrated which may be any suitable commercially available form will respond to a temperature signal via sensor 40 and will adjust flap 36 to maintain the exit temperature at this station at a predetermined value. In this instance the value will be established as the optimum temperature necessary to achieve maximum engine performance at aircraft altitude cruise or climb.

The fuel control schematically illustrated and represented by the blank box 44 serves to regulate fuel to the burner section 32 to run the engine at the desired compressor speed (RPM) and power. Such fuel controls and their operation are well known and for further details of a suitable fuel control reference should be made to the model JFC-60 or JFC-25 manufactured by the Hamilton Standard Division of United Technologies Corporation or U.S. Pat. No. 2,822,666 granted to S. G. Best on Feb. 11, 1958.

As will be apparent to one skilled in this art, adjusting flap 36 and hence changing the flow in the bypass duct 24 will affect the back pressure on the fan 22. To avoid any adverse affect, it is contemplated that the exit area of duct 24 will vary. Flaps 46 are illustrative of means for varying the exit area and it may be operated as a function of sensed pressure, as illustrated by the pressure sensor 48 and controller 50, in any well known manner.

Other ways to control the pressure of the air entering the high spool include varying the jet nozzle 34, the pitch of fan 22, the angle of the stators in the low pressure compressor, the angles of the stators in the high pressure compressor, or variable the area of the nozzles in the low pressure turbine. Design implementation will depend on the detailed engine performance requirements and the mission of the aircraft.

It should be understood that the invention is not limited to the particular embodiments shown and described herein, but that various changes and modifications may be made without departing from the spirit or scope of this novel concept as defined by the following claims.

I claim:

1. An aircraft twin spool gas turbine power plant having a high and low compressor,
   and high and low turbine for driving said high and low compressors, respectively,
   a combustor disposed between said compressors and said turbines for generating hot gases for driving said turbines,
   fuel control means for regulating the flow of fuel to said combustor so as to operate said high compressor said high compressor at a predetermined speed and compression ratio,
   means for controlling the high compressor inlet pressure by spilling air exhausting from said low compressor such that at all aircraft altitudes, when the compressor operates at said predetermined rotational speed and compression ratio, the compressor discharge pressure and temperature are substantially the same for all conditions of said power plant over the flight envelope of the aircraft.

2. An aircraft gas turbine power plant as in claim 1 wherein said control means is responsive to high compressor discharge temperature.

3. An aircraft gas turbine power plant as in claim 2 wherein said control means controls the high compressor inlet pressure by operating a bypass means located between said low and high spools.

4. An aircraft gas turbine power plant as in claim 3 wherein said power plant further includes:
   a fan,
   a turbine means for driving said fan,
   a bypass duct surrounding said fan and said bypass means,
   a variable geometry exit nozzle mounted on the downstream end of said bypass duct, and
   control means responsive to the pressure of the air discharging from said fan for controlling the area of said variable exit nozzle.

5. A method of operating a multiple spool gas turbine power plant for powering aircraft, including the steps of operating the high spool of said power plant at substantially the same, predetermined compression ratio at all altitudes and
   controlling the pressure of the air entering said high spool such that at all aircraft altitudes when said high spool compresses the air by said predetermined compression ratio, the temperature of the air discharging from said high spool is substantially the same as at aircraft climb or cruise condition.

* * * * *

UNITED STATES PATENT AND TRADEMARK OFFICE
CERTIFICATE OF CORRECTION

PATENT NO. : 4,055,946
DATED : November 1, 1977
INVENTOR(S) : William H. Sens

It is certified that error appears in the above-identified patent and that said Letters Patent are hereby corrected as shown below:

Column 1, line 16    "the high pressure" should read

--the high pressure requires-- line 64    after "air entering" delete -- pressure of --

Column 3, line 24    "angles" should read --angle line 25    "or variable the area" should read --or the area--

Signed and Sealed this

Fifth Day of September 1978

[SEAL]

Attest:

RUTH C. MASON
Attesting Officer

DONALD W. BANNER
Commissioner of Patents and Trademarks